Patented Oct. 2, 1951

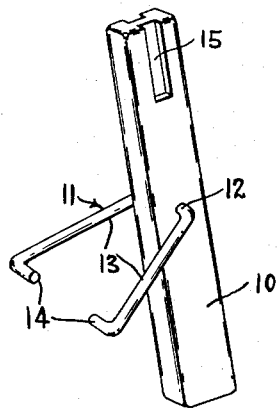
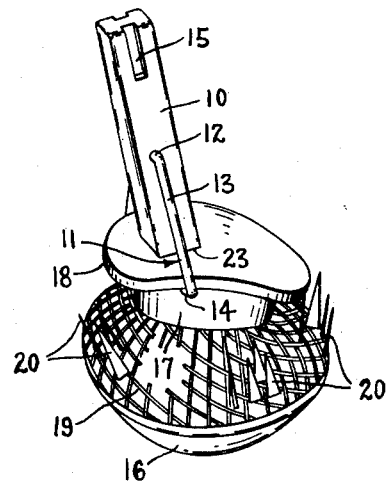
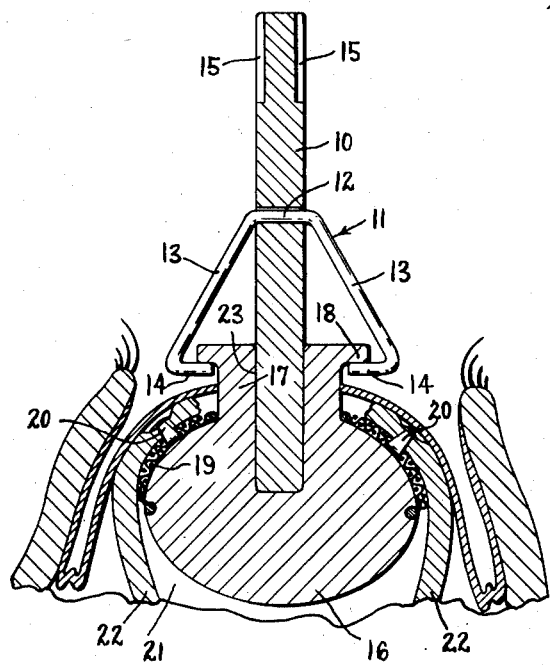

2,570,149

UNITED STATES PATENT OFFICE 2,570,149

DEVICE FOR AIDING IN PERFORMING EYE SURGERY

Conrad J. Noelle, Southbridge, Mass., assignor to American Optical Company, Southbridge, Mass., a voluntary association of Massachusetts Application November 25, 1949, Serial No. 129,284

4 Claims. (Cl. 128—303)

This invention relates to devices for aiding in performing eye surgery and has particular reference to the provision of means for supporting the implant portion of an artificial eye in the socket from which the human eye has been removed whereby the said implant portion will be held in a fixed position during the attachment of the eye muscles and other eye tissues to said implant.

A principal object of the invention is to provide a device which may be removably secured to the implant portion of an artificial eye for efficiently supporting said implant portion during the insertion thereof into the vacated eye socket of an individual and for retaining said implant in a relatively fixed position in the socket while the eye muscles and other eye tissues are being attached thereto.

Another object is to provide a device of the above character in the form of an elongated post having an end shaped for insertion in a co-mating opening in the anterior surface of the implant and pivotally carrying a wire-like retaining member having inturned end portions shaped to be positioned beneath a flanged portion of the implant and in frictional engagement therewith for securely and detachably connecting the implant to the post.

Another object is the provision of a device of the above character wherein the elongated post is provided with a groove in each of the opposed side surfaces thereof adjacent its outer end for reception of the gripping ends of forceps or other instrumentation which may be used by a surgeon for supporting the artificial eye.

Other objects and advantages of the invention will become apparent from the following description taken in connection with the accompanying drawing, in which:

Fig. 1 is a perspective view of a device embodying the invention;

Fig. 2 is a perspective view of an artificial eye implant portion having the supporting device in attached relation therewith; and Fig. 3 is a fragmentary sectional view of an eye socket showing the method of supporting an implant portion therein.

In the art of enucleating an individual's eye and inserting an implant portion of an artificial eye in the vacant socket, it is very difficult to retain the implant portion in desired position in the socket while the muscles and other tissues are in the process of being attached to or positioned on or adjacent the artificial eye.

The present invention overcomes many objectionable features of the prior art in replacing human eyes with artificial eyes by providing a device for efficiently gripping and rigidly supporting the implant portion in the eye socket so that both of the surgeon's hands are free to perform the operation.

Referring more particularly to the drawing, wherein like characters of reference designate like parts throughout the several views, the device is shown as embodying an elongated supporting bar 10 preferably rectangular in cross-section and having a substantially U-shaped wire-like member 11 hingedly connected thereto. The bight portion 12 of the wire-like member 11 is rotatably located in a transverse opening formed in the supporting bar 10 and has its opposed arms 13 spread apart and angled outwardly in diverging relation, as best shown in Fig. 3, with the extreme end portions 14 being turned inwardly toward and substantially aligned with one another. Thus, due to the hinged attachment of the member 11 to the bar 10, the end portions 14 are permitted to swing freely.

The sides of the bar 10 are provided, adjacent one end thereof, with opposed grooves 15 which are shaped to receive the gripping ends of forceps or other similar means which may be used by the surgeon for supporting the device.

This device is particularly adapted for use with artificial eyes of the two-piece type. Such artificial eyes embody an implant or ball portion shaped to be inserted in the eye socket of an individual from which the human eye has been removed. The artificial eye is further formed with a visible or main eye portion which, in this instance, is formed separately of the implant portion and colored to match the other eye of the individual. The implant is provided with a rectangular opening and the main eye portion has a rectangular pin on the rear thereof by which the two portions may be detachably connected when in the eye socket beneath the lids. The implant portion of such an artificial eye is shown in Figs. 2 and 3 and embodies a ball-like portion 16 having an outwardly extending neck portion 17 on its anterior surface, which neck portion 17 is provided with a peripheral flange or lip 18.

The ball-like portion 16 is preferably provided with suitable means for attachment of the eye muscles and adjacent tissues such as a foraminous band or mesh 19 and pointed prongs 20 or similar connecting means for securing the eye muscles to the implant portion. Such means is shown in Fig. 3 wherein there is illustrated an implant portion located in an eye socket 21 and having the eye muscles 22 drawn into overlying relation with the mesh 19 and secured to the ball portion 10 by the prongs 20 which are adapted to pierce the muscles 22 and to be bent into overlying relation with the outer surface thereof for securely retaining them in place.

Such an implant portion is provided on the end of the anterior surface of the neck portion 17 with an opening 23 which is shaped to receive a pin or tongue formed on the rear surface of the main eye portion (not shown) whereby the main eye portion is retained in desired relation with the implant portion.

In using the device embodying the present invention for supporting an implant portion, the surgeon will insert an end of the bar 10 into the opening 23 in the ball portion 16. It is to be understood here that although the bar 10 has been described as being preferably rectangular in cross-section, it may be of any cross-sectional shape corresponding to the shape of the opening 23. When the end of the bar 10 is positioned in the opening 23, the hinged wire-like member 11 can be swung downwardly to position the inwardly turned end portions 14 beneath the peripheral flange 18 on the implant portion.

In this manner, the implant portion may be securely attached to the end of the bar 10. The bar 10 may then be gripped by forceps which are in turn attached to other suitable instrumentation whereby the implant portion can be easily inserted in the eye socket, properly supported and held in desired position therein while the muscles are being attached, after which the member 11 can be swung about its pivot to cause the end portions 14 to be disengaged from the flange 18, permitting the bar 10 to be withdrawn from the opening 23. By so doing, there is less chance of improper resultant positioning of the implant in the socket than is the case when no means is used for supporting and retaining the implant in desired position during the attachment of the muscles thereto and both of the surgeon's hands are free for use during the operation.

From the foregoing it will be seen that simple, efficient and economical means have been provided for accomplishing all of the objects and advantages of the invention. While the novel features of the invention have been described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. A device for use in supporting an artificial eye implant having a flange thereon, comprising an elongated bar having an end portion shaped for engagement with the anterior surface of said implant, and a latch member connected to said bar, said latch member having a bight portion and spaced arm portions with said bight portion being rotatably mounted in the bar and said arm portions being swingable about the axis of the bight portion, said arm portions having inturned end portions shaped to frictionally engage said flange for retaining said bar in engagement with said anterior surface of the implant, said bar further having means adjacent its free end for grasping the device, said means being in the form of longitudinal grooves formed in the opposed side surfaces of the bar.

2. A device for use in supporting an artificial eye implant having a flange thereon and a recess in its anterior surface comprising an elongated bar having an end portion shaped for insertion in said recess, and a substantially U-shaped latch member hingedly connected to said bar, said latch member having a bight portion rotatably mounted in the bar and spaced arm portions extending angularly from said bight portion and swingable about the axis of the bight portion, said arm portions having inturned end portions shaped to frictionally engage said flange for retaining said bar in said recess in the anterior surface of the implant, said bar further having means adjacent its free end for grasping the device, said means being in the form of longitudinal grooves formed in the opposed side surfaces of the bar.

3. A device for use in supporting an artificial eye implant having a flange thereon, comprising an elongated bar having an end portion shaped for engagement with a forwardly facing portion of said implant, and a retaining member connected to the intermediate portion of said bar, said retaining member having a pair of wire-like arm portions angled outwardly from the opposed sides of said bar in diverging relation and having inturned end portions directed toward each other, said end portions being in spaced relation and adapted to frictionally engage said flange for retaining said end portion of the bar in engagement with said forwardly facing portion of the implant.

4. A device for use in supporting an artificial eye implant having a flange thereon, comprising an elongated bar having an end portion shaped for engagement with a forwardly facing portion of said implant, and a retaining member connected to the intermediate portion of said bar, said retaining member having a pair of wire-like arm portions angled outwardly from the opposed sides of said bar in diverging relation and having inturned end portions directed toward each other and adapted to frictionally engage said flange for retaining said end portion of the bar in engagement with said forwardly facing portion of the implant, and the opposed end portion of said bar having indents in the surface thereof for convenient grasping of the device.

CONRAD J. NOELLE.

REFERENCES CITED

The following references are of record in the file of this patent:

FOREIGN PATENTS

| Number | Country | Date |
| --- | --- | --- |
| 14,963 | Great Britain | Nov. 3, 1887 |